May 6, 1958 B. K. SMITH 2,834,007
SHIFTING REGISTER OR ARRAY
Filed Oct. 7, 1954 2 Sheets-Sheet 1

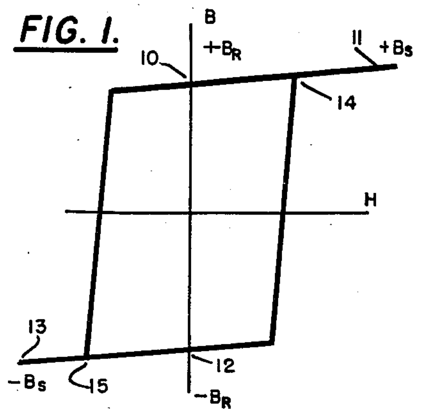

FIG. 1.

FIG. 4.

| Switch Position | Circuit Operation (For Each Power Pulse) |
|---|---|
| $S_1$ Closed Others Open | Signal Inlet |
| $S_2$ Closed Others Open | Recirculation |
| $S_3$ Closed Others Open | I To II; II To I; III To IV; IV To III |
| $S_4$ Closed Others Open | I To III; III To I; IV To II; II To IV |
| $S_5$ Closed Others Open | I To II; II To III; III To IV; IV To I |

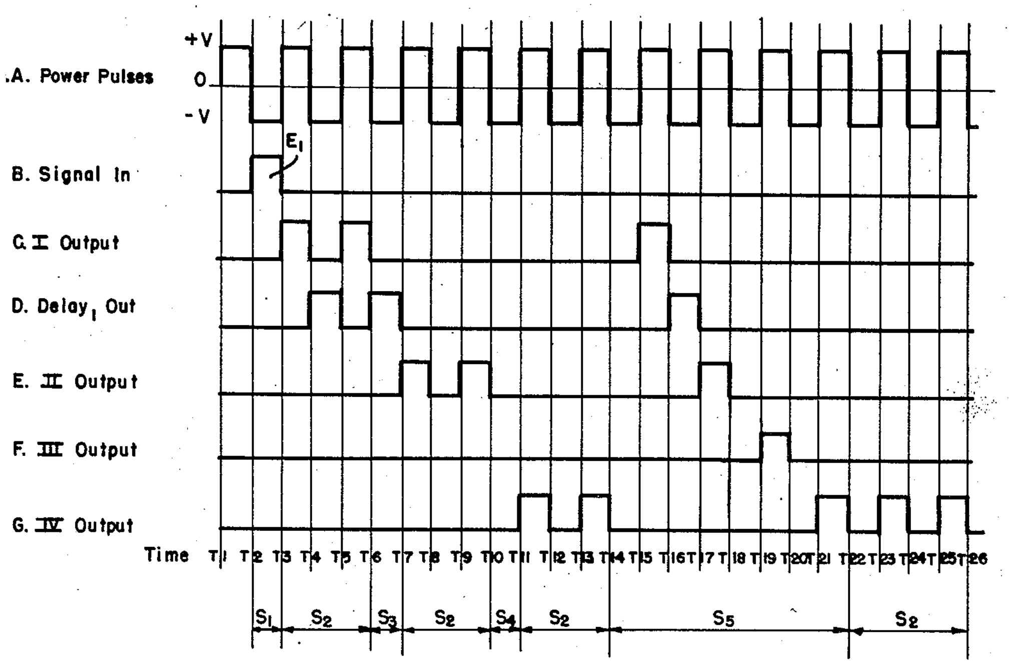

FIG. 3.

INVENTOR
BRUCE K. SMITH
BY [signature]
ATTORNEY

INVENTOR
BRUCE K. SMITH
BY [signature]
ATTORNEY 2,834,007

SHIFTING REGISTER OR ARRAY

Bruce K. Smith, Devon, Pa., assignor, by mesne assignments, to Sperry Rand Corporation, New York, N. Y., a corporation of Delaware Application October 7, 1954, Serial No. 460,949

19 Claims. (Cl. 340—174)

The present invention relates to pulse type electronic circuits and is more particularly concerned with such circuits which may perform the function of a shifting register or of an array of such registers or gates. In particular, the present invention is concerned with circuits and devices of the type described which employ magnetic amplifiers in performing the desired functions thereof.

In various electronic systems, and in particular, in computing arrangements, it is often desired to provide shifting registers or arrays of such registers. It is further often desired to provide arrays of gating devices for the selective routing and storage of signals in the overall system.

In the past, such shifting registers and gates, or arrays thereof, have employed vacuum tube circuitry in conjunction with plural resistors or equivalent impedances, and the use of such known circuitry has been accompanied by the disadvantages that the resulting systems are relatively fragile in configuration, are subject to normal operating failures, and further, are relatively large in size and costly to provide and maintain.

The present invention serves to obviate the foregoing difficulties and in essence provides electronic circuits capable of performing the function of a shifting register, of a gate, or of arrays thereof, through the utilization of magnetic amplifiers.

It is accordingly an object of the present invention to provide an improved shifting register.

A further object of the present invention resides in the provision of an improved electronic circuit capable of performing the function of an interconnected array of shifting registers.

Still another object of the present invention resides in the provision of an electronic circuit producing the effect of a large array of gates.

Another object of the present invention resides in the provision of an improved shifting register or array utilizing magnetic amplifiers as components thereof.

Still another object of the present invention resides in the provision of devices of the type described which are inexpensive to construct and which exhibit considerable ruggedness.

A still further object of the present invention resides in the provision of devices of the type described which can be made in relatively small sizes.

Still another object of the present invention resides in the provision of magnetic amplifier circuits which permit considerable facilitiy of operation in the routing and storage of electrical pulses.

In providing for the foregoing objects, the present invention preferably utilizes a plurality of magnetic amplifiers each of which is equipped with a multiplicity of electrically separated input or signal windings. The said multiplicity of signal windings are in turn coupled respectively to common busses as well as to signal sources, and the said signal sources may in turn comprise either external sources or the signal output of selected ones of said amplifiers. The said busses are coupled to switch devices or control means whereby selected ones of said busses may be rendered conductive at will, thereby to cause external signals to be admitted to the array, to be selectively shifted from one portion to another portion of the said array, and to be selectively read out thereof. The arrangement thus provided performs the functions of an array of shifting registers or of a single shifting register and further may be utilized to perform the function of an array of gates, these functions being provided at considerably less cost and with a decreased dissipation of power than has been the case heretofore. In addition, the device so resulting performs the functions described previously in a less expensive and more efficient structure than has been the case in the past.

The foregoing objects, advantages, operation and construction of my invention will become more readily apparent from the following description and accompanying drawings, in which:

Figure 1 is an idealized hysteresis loop of a magnetic material which may preferably be employed in the cores of magnetic amplifiers such as may be utilized in the practice of the present invention.

Figure 3 (A through G inclusive) are waveforms illustrating the operation of the circuit shown in Figure 2 for one assumed operating sequence; and Figure 4 is a tabulation describing the circuit operation, for various switch positions, of the device disclosed in Figure 2.

Figure 2:
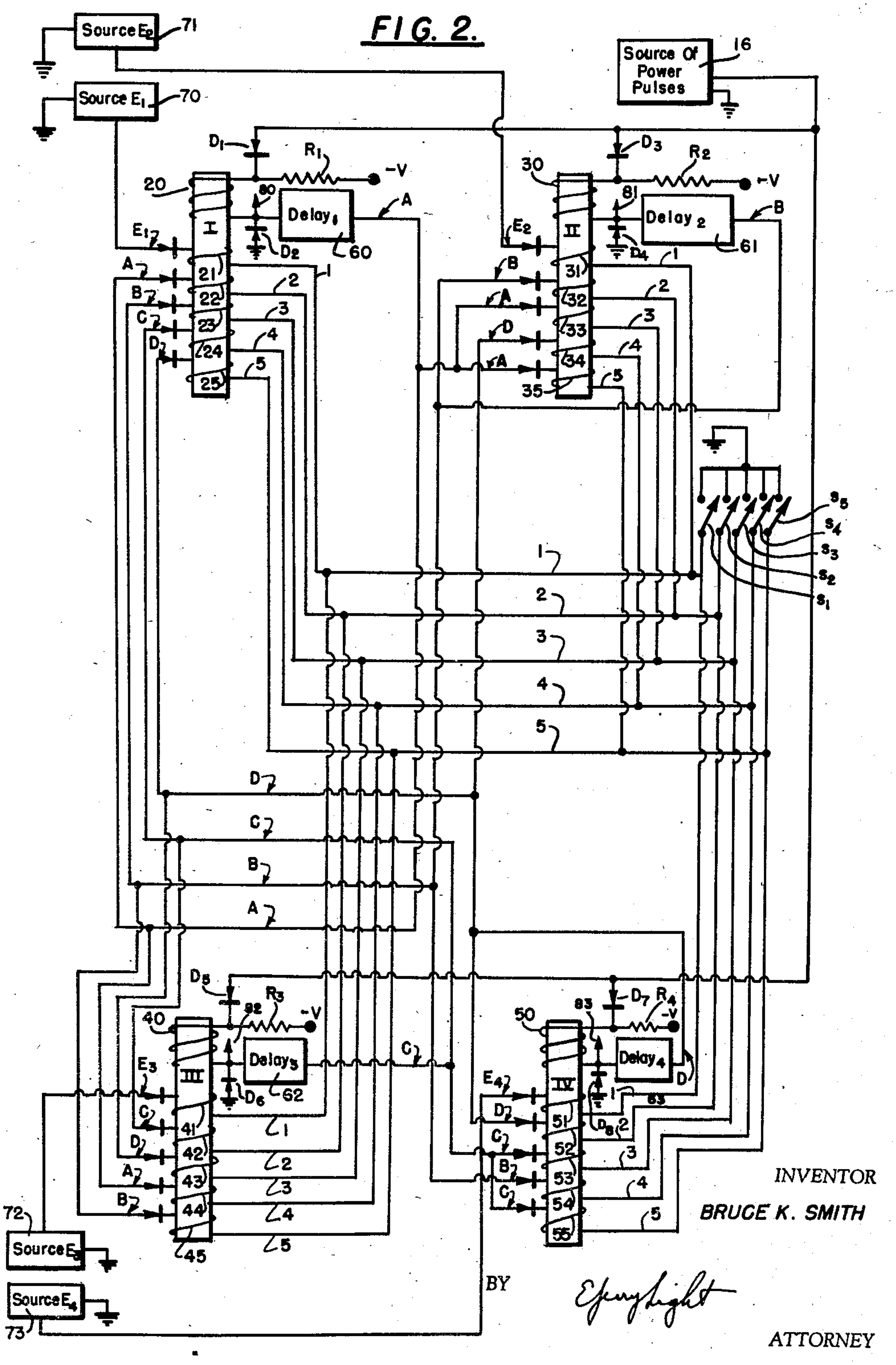
Figure 2 is a schematic representation of a shifting register or array in accordance with one form of the present invention.

Referring now to Figure 1, it will be seen that the magnetic amplifiers of my invention may preferably but not necessarily utilize magnetic cores exhibiting a substantially rectangular hysteresis loop. Such cores may be made of a variety of materials, among which are the various types of ferrites and various kinds of magnetic tapes including Orthonik and 4–79 Moly-permalloy. These materials may be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible.

In the following description, bar type cores have been utilized for ease of representation and for facility in showing winding directions. The bar type cores shown may in fact be considered to represent the end view of a toroidal core. The following description also refers to the use of materials having substantially rectangular hysteresis loops, and this is again for ease of discussion. However, it must be understood that neither the precise core configuration nor the precise hysteretic character of core material is mandatory, and many variations will readily suggest themselves to those skilled in the art.

Referring now to the hysteresis loop shown in Figure 1, it will be noted that the curve exhibits several significant points of operation, namely, point 10 ($+B_r$) which represents a point of plus remanence; the point 11 ($+B_s$) which represents plus saturation; the point 12 ($-B_r$) which represents minus remanence; the point 13 ($-B_s$) which represents minus saturation; the point 14 which represents the beginning of the plus saturation region; and the point 15 which represents the beginning of the minus saturation region. Discussing for the moment the operation of a device utilizing a core exhibiting a hysteresis loop such as has been shown in Figure 1, let us initially assume that a coil is wound on the said core. If we should now further assume that the core is at its operating point 10 (plus remanence) and if a voltage pulse is applied to the coil which produces in the said coil a current creating a magnetomotive force in a direction tending to increase the flux in the said core (i. e. in the direction of +H), the core will tend to be driven from its operating point 10 (+B*r*) to its operating point 11 (+B*s*). During this particular state of operations, there is relatively little flux change through the said coil and the coil therefore presents a relatively low impedance whereby energy fed to the said coil during this state of operation will pass readily therethrough and may be utilized to effect a usable output.

On the other hand, if the core should initially be at point 12 (−B*r*), prior to the application of the said +H pulse, upon application of such a pulse the core will tend to be driven from its operating point 12 (−B*r*) to the region of plus saturation. The pulse magnitude should preferably be so selected that the core is driven only to the beginning of the plus saturation region, point 14. During this particular state of operation there is a very large flux change through the said coil and the coil, therefore, exhibits a relatively high impedance to the applied pulse. As a result, substantially all the energy applied to the coil when the core is initially at −B*r* will be expended in flipping the core from its operating point 12, to the region of plus saturation (preferably to point 14), and thence to operating point 10 (+B*r*), with very little of this energy actually passing through the said coil to give a usable output. Thus, depending upon whether the core is initially at point 10 (+B*r*) or at point 12 (−B*r*), an applied pulse in the +H direction will be presented respectively with either a low impedance or a high impedance, and will effect either a relatively large output or a relatively small output. These considerations are of great value in the construction of magnetic amplifiers, such as may be utilized in the practice of the present invention.

Referring now to Figure 2, it will be seen that a shifting register or array, in accordance with the present invention, may utilize a plurality of magnetic amplifiers, interconnected as shown. Before discussing the particular construction and operation of the array shown, however, let us examine the operation of a magnetic amplifier of the non-complementing type; and in this respect, a non-complementing amplifier is defined as one which produces an output only when an input is presented thereto. The arrangement of Figure 2 utilizes, in accordance with one embodiment of the present invention, a plurality of such non-complementing magnetic amplifiers, and it will be seen that one such amplifier may comprise a magnetic core I preferably, but not necessarily, exhibiting a hysteresis loop substantially similar to that discussed in reference to Figure 1. The said core I carries a plurality of windings thereon, namely, a power or output winding 20 and a plurality of signal or input windings for example, 21 through 25, inclusive. One end of the power winding 20 is coupled via diode or buffer D1, poled as shown, to a source of positive and negative going power pulses 16, the pulse configuration of which is as shown in Figure 3A. For the purposes of the following discussion, the power pulses are assumed to have a center value of zero volts and to exhibit excursions between plus and minus V volts.

Disregarding for the moment the operation of the signal or input windings, and assuming that the magnetic core I is initially at its −B*r* operating point 12, it will be seen that the application of a positive going power pulse from the source 16 via the diode D1 to the power or output winding 20 will cause a current to flow through the said winding 20. As was discussed previously, the energy of this applied pulse is for the most part expended in flipping the core from its −B*r* operating point 12 to its +B*r* operating point 10, and no usable output is obtained from the amplifier during this particular state of operation. During the next succeeding time period, when the applied power pulse is negative going in nature, the diode D1 will be cut off and a reverse current flow will pass from ground through the diode D2 connected to the lower end of the power winding 20, and thence through the said winding 20 and the resistor R1 to a source of negative potential −V. The value of this current is substantially $$\frac{V}{R1}$$

and R1 is so chosen that the current flow in the said reverse direction through coil 20 is of sufficient energy content to flip the core I, during the said next succeeding time period, from its +B*r* operating point 10 back to its −B*r* operating point 12 preparatory to the application of the next positive going power pulse. Thus, the core 20 will once more find itself at its −B*r* operating point when the said next positive going power pulse is applied, and a further positive going power pulse applied via the diode D1 will again merely flip the core I to its +B*r* operating point, again without effecting an output.

Thus, in the absence of any other input signals, the core I will be regularly flipped from its −B*r* to +B*r* operating points, and thence back to its −B*r* operating point, without any useful output being obtained from the amplifier.

If we should now assume that a signal input pulse causes current to flow through any one of the input windings 21 through 25, inclusive, this input pulse will cause the core I to be subjected to a supplemental magnetizing force. If the input pulse is in fact applied to one of the said input windings during the application of a negative going power pulse to the power or output winding 20, the said supplemental magnetizing force will oppose the magnetization effect of the reverse current flow via diode D2, winding 20, and resistor R1 during this same time period. Therefore, the application of such an input pulse to one of the input windings 21 through 25, inclusive, during the application of a negative going power pulse will cause the core I to remain at its +B*r* operating point 10 during the application of the said negative going power pulse. The next positive going power pulse will, as a result, cause the said core I to be driven from its +B*r* operating point 10 to its +B*s* operating point 11 whereby a significant output will be obtained from the amplifier.

Therefore, and by way of summation, it will be seen that in the absence of an input pulse during the application of a negative going power pulse, the magnetic amplifier shown will produce no useful output, while, on the other hand, the application of such an input pulse during a negative going power pulse will cause the amplifier to produce an output pulse during the next succeeding positive going power pulse. The device thus acts as a non-complementer and in fact each of the magnetic amplifiers shown in Figure 2, comprising respectively cores I through IV inclusive, may be considered to operate in accordance with the preceding discussion.

Referring now to the particular arrangement shown in Figure 2, it will be seen that a plurality of non-complementing magnetic amplifiers of the type described are provided and these are represented, respectively, by the devices utilizing magnetic cores I, II, III and IV. The core I carries, as was discussed previously, a power or output winding 20 and signal or input windings 21 through 25, inclusive, thereon. Similarly, the magnetic amplifier core II carries a power or output winding 30 and signal or input windings 31 through 35, inclusive, thereon; amplifier core III carries a power or output winding 40 and signal or input windings 41 through 45, inclusive, thereon; and magnetic amplifier core IV carries a power or output winding 50 and signal or input windings 51 through 55, inclusive, thereon. The upper ends of each of said power windings 20, 30, 40 and 50 are coupled respectively via diodes or buffers D1, D3, D5 and D7 to the source of power pulses 16 and the lower ends of the said power or output windings are respectively coupled to ground via diodes D2, D4, D6 and D8. The said diodes D2, D4, D6 and D8 cooperate respectively with resistors R1, R2, R3 and R4 to permit the selective passage of the previously described reverse current flow through the respective power windings during the the occurrence of negative going power pulses from the source 16.

The several signal or input windings 21 through 25, 31 through 35, 41 through 45 and 51 through 55 are interconnected with busses and with signal sources, both external and internal, in a manner to be described, whereby the overall system may act as a shifting register, as a gating device or as an array of such shifting registers or gates. In addition, the output selectively appearing from each of the said amplifiers is coupled through delay means 60, 61, 62 and 63 and the outputs of the said delay means are in turn selectively coupled to the several input windings in the manner to be described. It should be noted that the delay means, 60 through 63, inclusive may take the configuration of a conventional delay line or may comprise inductors, capacitors, or active delays such as magnetic amplifiers, and the only requirement of these several delay devices is that they effect a time delay equal to the interval between the commencement and termination of a positive going power pulse.

For ease in explaining the interconnection of the several windings shown, it will be noted that in Figure 2 a plurality of busses A through D inclusive, as well as a further plurality of busses 1 through 5 inclusive have been provided. In addition, the outputs of the delay means 60 through 63 inclusive have been respectively designated as A, B, C and D, and the inputs and outputs of the several signal or input windings have been labelled respectively with one of the letters A through D and with one of the numerals 1 through 5. Like numerals represent a plurality of point on a common bus and, similarly, like letters represent plurality of points on a common bus. Thus, the output of delay means 60, which output is represented by the point A, is selectively coupled to the input of signal winding 22 on core I; to the inputs of signal windings 33 and 35 on the core II; and to the input of signal winding 44 on the core III. Similarly, the output of delay means 61 (point B) is selectively coupled to the signal windings 23, 32, 45 and 54; the output of delay means 62 (point C) is selectively coupled to windings 24, 42, 53 and 55; and the output of delay means 63 (point D) is selectively coupled to signal windings 25, 34, 43 and 52.

Similarly, the lower ends of the signal windings 21 through 25 inclusive, 31 through 35 inclusive, 41 through 45 inclusive and 51 through 55 inclusive, are coupled respectively to the common busses 1 through 5 inclusive; and each of the said busses 1 through 5 inclusive is selectively coupled via switch means S1 through S5, inclusive, to ground. It must be noted that while switches S1 through S5 have been employed in the particular arrangement shown, such a switch construction has been adopted for ease of description only, and may in fact comprise pulse sources, or the like, adapted to overcome biases applied to the several busses. External signal sources 70 through 73, inclusive have further been provided and these signal sources are respectively coupled to the input windings 21, 31, 41 and 51.

Summarizing the foregoing scheme of interconnection, it will be noted that each of the signal windings 21, 31, 41 and 51 is selectively coupled at one of its ends to an external signal source, and at the other of its ends to the bus 1, and then, via the switch S1, to ground. Each of the signal windings 22, 32, 42 and 52 is coupled at one of its ends to the output of the delay device of the same amplifier on which that particular signal input winding appears, and is coupled at the other of its ends respectively to the bus 2 and then via the switch S2 to ground. Each of the signal windings 23 through 25; 33 through 35; 43 through 45; and 53 through 55 is coupled at one of its ends to the output of a delay means from an amplifier other than that on which the particular signal winding appears and is coupled at the other of its ends respectively to the one of the busses 3, 4 and 5 and thence via the switches S3, S4 and S5 to ground. The arrangement is such that when the switch S1 is closed, signal inputs may be received by the several amplifiers from one or more of the external sources 70 through 73, inclusive. Similarly, when the switch S2 is closed, an input may be received by a given amplifier from the output of the delay means associated with that same amplifier; and when one of the switches S3, S4 or S5 is closed, a signal may be received at the input of a given one of said amplifiers from the output of the delay means associated with another one of the said amplifiers.

Referring to Figure 4, therefore, it will be seen that when S1 is closed and the other switches are open, a signal may be passed from the external sources 70 through 73, inclusive, to the several amplifiers. When S2 is closed and the other switches are open, a recirculation or dynamic storage condition exists. When S3 is closed and the other switches are open, a pulse shifting occurs for each positive going power pulse, and the sequence of this pulse shifting is from I to II; from II to I; from III to IV; and from IV to III (the core designations being used to identify the amplifier in question). Again, when switch S4 is closed and the other switches are open, a further pulse shifting occurs for each positive going power pulse and the sequence of this further shift is I to III; III to I; IV to II; and II to IV. Similarly, when switch S5 is closed and the other switches are open, a still further shifting sequence is effected in which signals are shifted from I to II; II to III; III to IV; and IV to I for each applied positive going power pulse.

Examining now the waveforms shown in Figure 3, the operation of the device for one assumed switch sequence has been shown. As is depicted in Figure 3A, positive and negative going power pulses of the type described previously, are coupled from the source 16 via the diodes D1, D3, D5 and D7 to the corresponding power or output winding of each of the amplifiers shown. So long as each of the switches S1 through S5 is open, no signal may be coupled to any of the input windings of the several amplifiers and no output will be obtained from these amplifiers. If now, during the time interval $t2$ to $t3$, a signal should appear from the source 70, designated $E_1$, and if during this time period $t2$ to $t3$, the switch S1 should be closed, the input pulse will cause a current to flow through the signal or input winding 21 and thence via bus 1 and switch S1 to ground. As was discussed previously, therefore, the application of this signal input during the time period $t2$ to $t3$, corresponding to the application of a negative going power pulse, will cause the amplifier I to produce an output pulse during the time interval $t3$ to $t4$, and this output pulse will be passed through the delay means 60 and will appear as a further pulse on the bus A during the time $t4$ to $t5$. If we should further assume that the switch S2 is now closed during this time interval $t4$ to $t5$ and that the switch S1 has been opened, the output of delay means 60 will be passed via the bus A to the signal or input winding 22 of amplifier I and thence via bus 2 and switch S2 to ground. The pulse output of delay means 60, appearing on bus A during the time interval $t4$ to $t5$, coincides with an applied negative going power pulse, and the said pulse therefore acts as a further signal input to the amplifier I whereby a still further output pulse appears from the said amplifier I during the time interval $t5$ to $t6$. In short therefore, the closing of the switch S2 causes a recirculating condition to occur in the amplifier I and this recirculating condition is in effect a dynamic storage of a signal appearing from the source 70. By analogy, it will be seen that any signals appearing from the sources 71, 72 and/or 73, during a time interval when the switch S1 is closed, will similarly be dynamically stored in the amplifiers II, III and IV by the subsequent closure of the switch S2.

If now, during the time interval $t6$ to $t7$, the switch S3 should be closed, it will be seen that the output of delay means 60, appearing on the bus A, will be coupled via the said bus A to the signal or input winding 33 of amplifier II and thence via the bus 3 and switch S3 to ground. If switch S3 should then be reopened and switch S2 closed during the time interval $t7$ to $t10$, for instance, the amplifier II will assume a recirculating condition, representative of a dynamic storage of a pulse shifted to amplifier II from the output of the amplifier I. By analogy, and examining Figures 2 and 4, it will be seen that the closure of switch S3 not only will cause a shift of the output from amplifier I to amplifier II but will cause a further shift of any signals appearing at the output of amplifier II to amplifier I. Similarly, there will be a shift of signals from III to IV and from IV to III.

If now, during the time interval $t10$ to $t11$, the switch S4 should be closed, the output of delay means 61 appearing on bus B will be passed via the signal winding 54 of amplifier IV to bus 4, and thence via switch S4 to ground. The opening of switch S4 and closing of switch S2 at time $t11$ will therefore cause a further recirculation to commence in amplifier IV representative of a signal shift from amplifier II to amplifier IV. The corresponding signal shifts occurring among the other amplifiers can once more be seen from an examination of the tabulation of Figure 4; the closure of the switch S5 will, as shown, cause a still further shift, in a further characteristic sequence, to occur among the several amplifiers.

It should be noted that in the description thus far given, the switches S1, S3 and S4 have been closed for a single time period only, representative, for instance, of the application of a shift pulse for overcoming the bias on one of the busses. This is not mandatory, however, and, in fact, if the switches are closed for a longer time period (or if a correspondingly wider shift pulse should be applied) the shift sequence discussed previously, for each of the said switches, will be effected successively during the application of each positive going power pulse from the source 16. Thus, returning once more to the waveforms of Figure 3, it will be seen that if the switch S5 is closed for the time period $t14$ to $t22$, the output pulse appearing on bus D during the time interval $t13$ and $t14$ (Figure 3G) will first be shifted to the amplifier I and will effect an output therefrom during the time interval $t15$ to $t16$; this output, appearing after suitable delay on bus A, will cause a further output pulse to appear from amplifier II during the time interval $t17$ to $t18$; this further output, appearing after suitable delay on the bus B, will cause a still further output to appear from amplifier III during the time interval $t19$ to $t20$; and this still further output from amplifier III, appearing after suitable delay on the bus C, thereby causes still another output from the amplifier IV during the time interval $t21$ to $t22$. If then the switch S2 should be reclosed at the time $t22$, the output of amplifier IV will once more be dynamically stored in the said amplifier IV and will appear as a series of output pulses, as has been shown.

A similar sequential and regularly occurring shift will be effected for the extended closure of any of the other switches shown. Again it must be stressed that the said switches may in fact be replaced by pulse sources tending to overcome fixed biases applied to the several busses. By arrangement thus described, therefore, and by the proper application and removal of biases or external pulses in any appropriate or desired sequence, a plurality of signals may be received from external sources and may be stored and circulated in a predetermined manner among the several amplifiers comprising the array. In addition, it should be noted that the presence of a signal in any one of the said amplifiers may be observed by tapping off some of the amplifier output at the points 80, 81, 82 and 83 respectively. Thus, when signals are being recirculated through a given amplifier, they may, for instance, be read off repeatedly without destroying the stored information. The arrangement thus produces the effect of a shifting register or of a gate, or of a large array of such registers or gates in a most economical and efficient manner.

While I have described preferred embodiments of my invention, many variations will readily suggest themselves to those skilled in the art. In particular, the precise non-complementing magnetic amplifiers shown are merely illustrative. While the particular amplifier discussed may be considered to represent a series type non-complementing amplifier, the present invention may be effected with parallel type non-complementing amplifiers, as well as with complementing amplifiers of both the series and parallel type, in accordance with known principles.

It should further be noted that while I have discussed an arrangement comprising four magnetic amplifiers, each of which has five input windings thereon, this is by no means mandatory; and in fact as many amplifiers having as many input windings respectively as may be desired for any given application, can be utilized in the practice of the present invention. As a special case of the present invention, for instance, a plurality of amplifiers each of which has three input windings may be provided. In such an arrangement the first winding of each amplifier might selectively receive suitably delayed signals from the amplifier to one side thereof; the second winding of each amplifier might receive suitably delayed signals from the particular amplifier carrying that winding; and the third winding on each amplifier could selectively receive suitably delayed signals from the amplifier on the other side thereof. By such an arrangement, therefore, a "left shift," a dynamic storage, or a "right shift" could be accomplished depending upon which of the three sets of input windings are unbiased sufficiently to receive signals.

Still further modifications will be readily apparent to those skilled in the art, and all such variations as are in accord with the principles discussed previously, are meant to fall within the scope of the present invention as set forth in the appended claims.

Having thus described my invention, I claim:

1. A pulse type array comprising a plurality of magnetic amplifiers, each of said amplifiers including a core of magnetic material having a power winding and a plurality of input windings thereon, means coupling a source of regularly occurring power pulses to one end of each of said power windings, first coupling means connecting the other end of the power winding of each of said amplifiers to one end of at least a first input winding of the same said amplifier, second coupling means connecting the output of each of said amplifiers to one end of at least a second input winding of another of said amplifiers, and control means coupled to the other ends of each of said input windings for selectively permitting or inhibiting the passage of signal currents through said input windings.

2. The array of claim 1 in which each of said magnetic amplifiers comprises a non-complementing magnetic amplifier.

3. The array of claim 2 in which said first and second coupling means includes delay means effecting a pulse time delay equal substantially to the length of one of said power pulses.

4. The array of claim 3 in which each of said cores comprises a magnetic material exhibiting a substantially rectangular hysteresis loop.

5. The array of claim 1 including an external source of signals coupled to at least one input winding on at least one of said amplifiers.

6. A pulse type array comprising a plurality of magnetic amplifiers, each of said amplifiers including a core of magnetic material having a power winding and a plurality of input windings thereon, a source of regularly occurring power pulses coupled to said power windings, first means coupling the output of each of said amplifiers to one end of at least one input winding of the same said amplifier, second means coupling the output of each of said amplifiers to one end of at least one further input winding of another of said amplifiers, a plurality of busses interconnecting the other ends of the input windings of said plurality of amplifiers into a plurality of distinct input winding groups, and control means coupled to said busses for selectively rendering non-conductive the windings in selected ones of said winding groups.

7. The array of claim 6 in which each of said groups includes at least one input winding on each of said magnetic amplifiers.

8. The array of claim 7 including an external pulse source selectively coupled to an input winding on at least one of said amplifiers.

9. The array of claim 6 in which each of said magnetic amplifiers includes means passing a current through said power windings in the intervals between power pulses in a direction reverse to that of the current flow through said power windings effected by said power pulses.

10. The array of claim 6 in which said first and second means includes delay means.

11. The array of claim 10 in which each of said cores comprises a magnetic material exhibiting a substantially rectangular hysteresis loop.

12. The array of claim 6 in which said busses interconnect said input windings in at least three distinct groups, one of said groups comprising an interconnection of an input winding of each amplifier to the output winding of the same said amplifier, a second of said groups comprising an interconnection of a further input winding of each amplifier to the output winding of a preceding amplifier in said array, and a third of said groups comprising an interconnection of a still further input winding of each amplifier to the output winding of a succeeding amplifier in said array.

13. The array of claim 12 including a source of external signals selectively coupled to at least one input winding of at least one of said amplifiers.

14. The array of claim 6 in which at least one of said groups includes at least one input winding on each of said amplifiers, and a plurality of external signal sources coupled respectively to the input windings in said one of said groups.

15. A pulse type array comprising a plurality of non-complementing magnetic amplifiers, each of said amplifiers including a core of magnetic material exhibiting a substantailly rectangular hysteresis loop, each of said cores having a power winding and input winding means thereon, a source of spaced regularly occurring power pulses coupled to one end of each of said power windings, first means connecting the other end of the power winding of each of said amplifiers to one end of the input winding means of the same said amplifier, second means connecting the said other end of the power winding of each of said amplifiers to one end of the input winding means of another of said amplifiers, a plurality of lines interconnecting the other ends of said input winding means into a plurality of distinct input winding groups each of which groups includes input windings carried by a plurality of said cores respectively, and control means coupled to each of said winding groups for selectively inhibiting and permitting current flow in preselected ones of said input winding groups.

16. The combination of claim 15 wherein said control means comprises switch means for selectively applying a preselected potential to a selected one of said interconnecting lines.

17. The combination of claim 15 wherein said second means connects the said other end of each power winding to a plurality of input windings in a plurality of other ones of said amplifiers respectively.

18. The combination of claim 17 wherein said last-mentioned plurality of input windings are disposed respectively in different ones of said input winding groups.

19. A pulse type array comprising a plurality of pulse type magnetic amplifiers each of which has an output and a plurality of inputs, first means coupling the output of each of said amplifiers to a first input of the same said amplifier, second means coupling the output of each of said amplifiers to second inputs in preselected other ones of said amplifiers, third means coupling the output of each of said amplifiers to third inputs in still other preselected ones of said amplifiers, means interconnecting each of said first inputs in a first input group, means inter connecting each of said second inputs in a second input group, means interconnecting each of said third inputs in a third input group, and control means for selectively rendering a preselected one of said first, second and third input groups conductive, whereby each amplifier of said array recirculates information when said first input group is conductive, said array shifts information in a given sequence when said second input group is conductive, and said array shifts information in a different sequence when said third input group is conductive.

References Cited in the file of this patent

UNITED STATES PATENTS 2,710,952 Steagall ---------------- June 14, 1955

OTHER REFERENCES

Thesis, by M. K. Haynes, "Magnetic Cores as Elements of Digital Computing Systems." Dec. 1950, pp. 33–35, 46–50, 57–58. (Copy in Div. 42.)

Publication, AIEE Transactions, Part I, Communications and Electronics, pp. 442–446.